United States Patent [19]

Helms

[11] 4,416,843
[45] Nov. 22, 1983

[54] METHOD OF FORMING COMPOSITE DISPLAY PACKAGE

[75] Inventor: Charles R. Helms, Malvern, Pa.

[73] Assignee: Container Corporation of America, Chicago, Ill.

[21] Appl. No.: 434,508

[22] Filed: Oct. 15, 1982

Related U.S. Application Data

[63] Continuation-in-part of Ser. No. 261,586, May 7, 1981, abandoned.

[51] Int. Cl.³ .......................... B29C 17/10; B29C 6/02
[52] U.S. Cl. .................................. 264/152; 264/153; 264/156; 264/160; 264/266
[58] Field of Search ............... 264/152, 153, 154, 156, 264/266; 246/157, 160

[56] References Cited

U.S. PATENT DOCUMENTS

| 2,589,022 | 3/1952 | Page, Jr. et al. | 264/153 |
| 2,900,667 | 8/1959 | Longenecker | 264/153 |
| 3,475,526 | 10/1969 | Sato | 264/153 |
| 3,645,384 | 2/1972 | Wind | 220/315 |
| 3,908,827 | 9/1975 | Bemmels et al. | 206/478 |
| 4,076,790 | 2/1978 | Lind | 264/266 |

Primary Examiner—James B. Lowe
Attorney, Agent, or Firm—Richard W. Carpenter; Davis Chin

[57] ABSTRACT

A method of forming a plurality of composite paperboard and plastic packages from a single blank of foldable paperboard. Each of the packages includes paperboard panels having at one end thereof an integral pocket for holding a packaged article. The pockets consist of shells which are formed integrally with the panels and have injected plastic therein covering the shells to form plastic liners.

1 Claim, 8 Drawing Figures

METHOD OF FORMING COMPOSITE DISPLAY PACKAGE

CROSS-REFERENCE TO RELATED APPLICATIONS

This is a continuation-in-part of application Ser. No. 261,586 filed on May 7, 1981, which is now abandoned.

BACKGROUND OF THE INVENTION

1. Field of the Invention

This invention relates generally to composite paperboard and plastic carded display packages of the type disclosed in detail in U.S. Pat. No. 4,351,436, issued on Sept. 28, 1982 in the name of Charles R. Helms, and more particularly to a method of forming a plurality of packages of this type from a single blank of foldable sheet material such as paperboard.

2. Description of the Prior Art

A state of the art search directed to the subject matter of this application in the U.S. Patent and Trademark Office uncovered the following U.S. Pat. Nos. 2,866,544, 3,127,698, 3,322,269, 3,657,855, 3,908,827, 4,092,201, 2,903,139, 3,179,246, 3,436,008, 3,698,551, 3,910,410, 4,109,821, 2,990,082, 3,275,274, 3,459,359, 3,770,120, 4,029,202, 3,023,924, 3,286,835, 3,645,384, 3,785,544, 4,076,790.

None of the prior art patents uncovered in the search disclosed a method of forming a composite paperboard and plastic carded display package in any way similar to the process outlined in the invention where a blank of foldable paperboard is divided into a pair of panels which are folded one atop the other and then inserted into a mold, where plastic is injected, and then where the plurality of packages are cut from the single blank.

SUMMARY OF THE INVENTION

It is an object of the invention to provide an improved visual carded dislay package adapted to stand on a shelf with similar packages or be suspended from a display rack.

Another object of the invention is to provide an improved visual carded display package formed of paperboard and plastic by an insert molding process.

A more specific object of this invention is to provide a method of forming a plurality of packages of the type described from a single bank of foldable sheet material, such as paperboard, in an injection molding operation.

These and other objects of the invention will be apparent from an examination of the following description and drawings.

It will be understood that, for purposes of clarity, certain elements may have intentionally omitted from certain views, where they are believed to be illustrated to better advantage in other views.

DESCRIPTION OF THE PREFERRED EMBODIMENT

Figure 1:
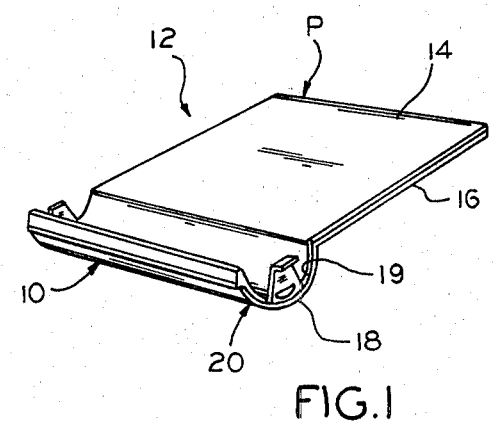
FIG. 1 is a perspective view of a single composite carded display package formed by the process of the present invention.

Referring now to the drawings for a better understanding of the invention, and particularly to FIG. 1, it will be seen that the package formed by the novel process of the invention is indicated generally at P.

Still referring to FIG. 1, it will be seen that display package P includes a hollow article holding or pocket member, indicated generally at 10, which is formed integrally with and projects from one end of a relatively flat advertising or card member 12.

Card member 12 may include a pair of relatively flat paperboard front and rear panels 14 and 16, respectively, which have corresponding edges and which are secured to each other in face-to-face relation.

At one end rear panel 16 is provided with integral extension 18 projecting therefrom which is shaped into a semi-cylindrical configuration by the molding press to define a channel 19. The exact shape of the channel may be modified to fit the contour of the particular article to be packaged therein.

Thus, extension 18 of rear panel 16 serves as a shell to which is bonded to a plastic material defined by a contoured liner 20 during the injection molding process.

The general construction of this package is accomplished in the same manner as the article described in U.S. Pat. No. 3,397,814. In this type of construction the paperboard portion of the package is inserted into a mold where selective elements of the paperboard may be shaped, and where the plastic then is injected onto selected areas of the paperboard to form the liner of the pocket member. At the same time, the liner is bonded to the shell and to portions of the display card in order to form a rigid composite package.

Figure 2:
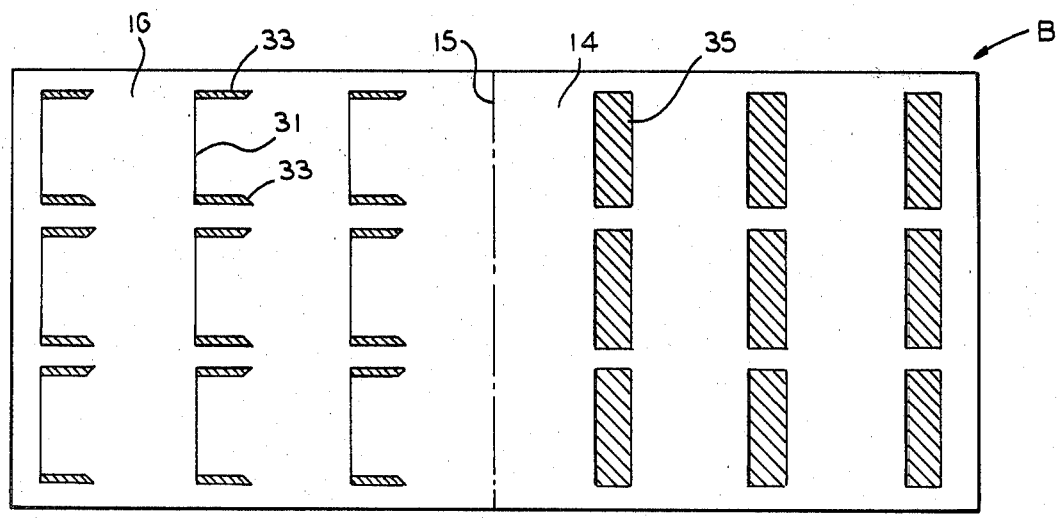
FIG. 2 is a plan view of a blank of foldable paperboard from which a plurality of packages similar to the single one illustrated in FIG. 1 may be formed.

Referring now to FIG. 2 of the drawings, it will be seen that there is provided a flat blank of foldable paperboard, indicated generally at B, which forms the basis of a gang card to form a plurality of packages similar to the single one illustrated in FIG. 1.

Blank B is divided by a score line 15 into a pair of panels 14 and 16 which, as will be seen later, will become the top and bottom or front and rear panel, respectively, of the carded packages formed by the process of the invention.

It will be seen that bottom panel 16 is provided with a series of cut lines 31 each of which has a pair of slots 33 extending from opposite ends thereof in parallel relation with each other.

Likewise top panel 14 is provided with a plurality of preferably rectangular cutouts or apertures 35.

In forming the package of FIG. 1, after the blank B has been formed with the score lines, cuts, and apertures, the blank is folded on fold line 15 so that top panel 14 overlies bottom panel 16 with the apertures 35 of panel 14 each overlying the sets of cut lines 31 and slots 33 of bottom panel or rear panels 16. The panels 14 and 16 may be adhesively secured to each other in face-to-face relationship, or the mating surfaces may be laminated with a heat sealable material which is activated in the molding press causing a bond.

Figure 3:
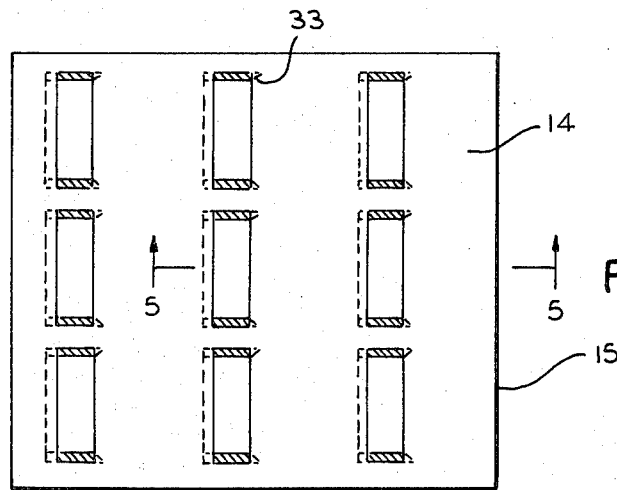
FIG. 3 is a plan view of the blank of paper-board illustrated in FIG. 2, but with one of the panels folded 180° to overlie the other panel.
Figure 4:
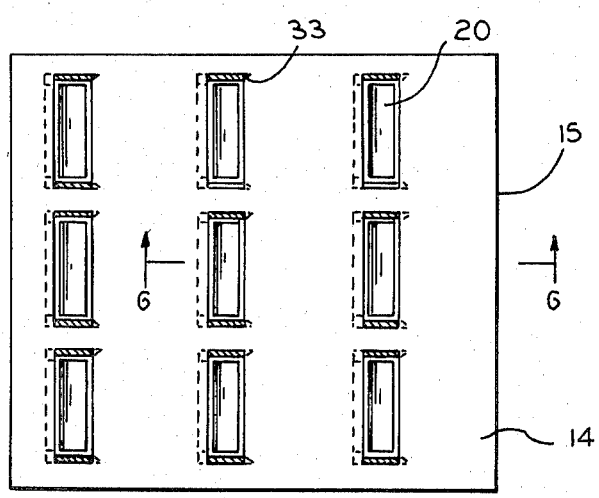
FIG. 4 is a plan view of the structure illustrated in FIG. 3 shown after the plastic has been injected onto the surface of the molded paperboard panels.
Figure 5:
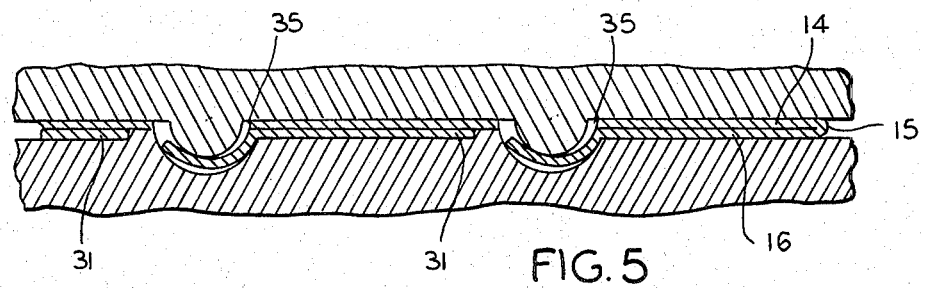
FIGS. 5 and 6 are transverse vertical sectional views taken on line 5—5 and 6—6 of FIGS. 3 and 4, respectively.
Figure 6:
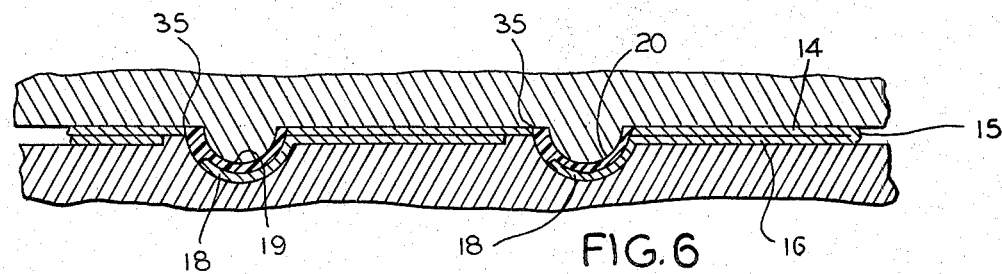

Then the panels, which form a gang card, are inserted into an injection molding machine or press wherein shell portions 18 of the card are shaped. The male die of inserted into an injection molding machine or press wherein shell portions 18 of the card are shaped. The male die of the mold protrudes through the apertures 35 of the top panel 14. At this point, the structure appears like that illustrated in FIGS. 3 and 5. Plastic material is then injected into the mold onto the surfaces of the shell portions 18 of the card to form the liners 20. After this has been done, the structure takes on the configuration like that illustrated in FIGS. 4 and 6.

Figure 7:
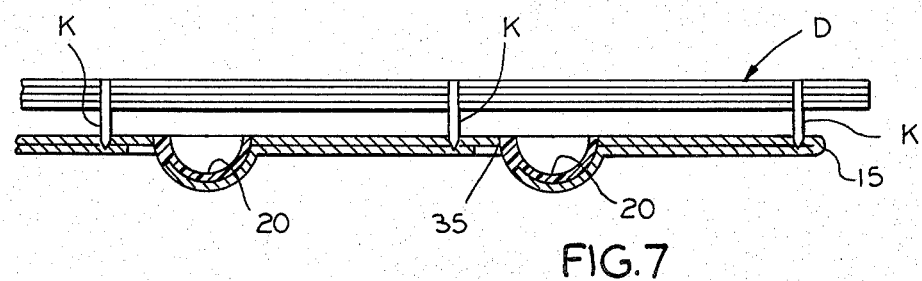
FIG. 7 is a view similar to FIG. 6 but illustrating the manner in which separate packages are cut from the molded blank of paperboard.

Now there is a gang card containing a plurality of packages of the type illustrated in FIG. 1 which are in position on the combined panels 14 and 16 of the blank B, as shown in FIG. 7. The packages can then be cut from the panels by a die, indicated generally at D, having a plurality of knives K.

Figure 8:
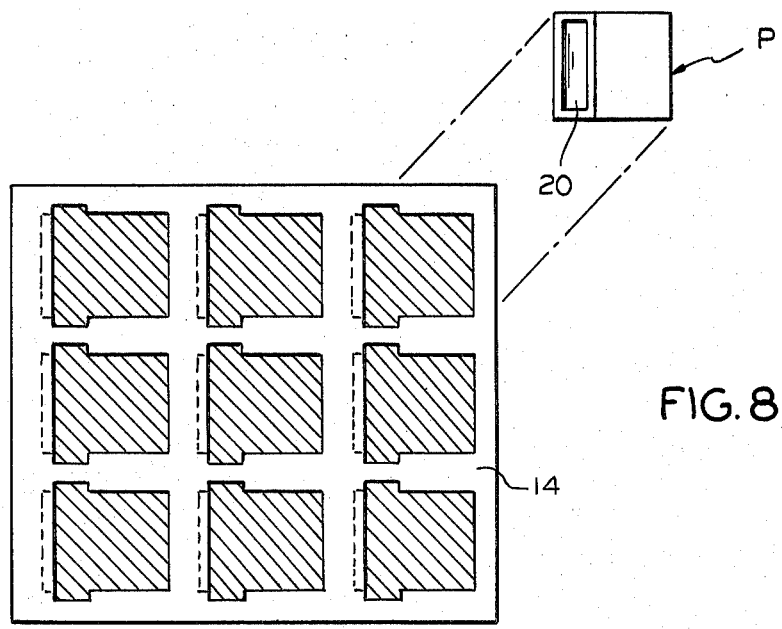
FIG. 8 is a view similar to FIG. 4, but as seen after the individual packages, shown at the right in FIG. 8, have been cut from the overall blank.

After this has been done the remaining panels look like the structure illustrated in FIG. 8, wherein the individual packages, shown at the upper right-hand part of FIG. 8, are withdrawn from the gang card.

Thus, it will be appreciated that the invention comprehends an efficient method of forming a plurality of visual card packages all at one time in an injection molding press from a single blank of foldable paperboard.

What is claimed is:

1. In a method for forming a plurality of composite carded display packages from a single blank of foldable paperboard, the steps comprising of:
   (a) forming a score line intermediate of said blank to divide said blank into a pair of first and second panels;
   (b) forming in the first panel of said blank sets of cut lines extending through said blank;
   (c) forming in the second panel of said blank sets of apertures extending through said blank;
   (d) folding one of said panels over the other and adhesively securing the panels to each other in face-to-face relation so that the apertures of said second panel are generally overlying and in alignment with the cut lines of said first panel;
   (e) inserting said panels into a molding machine;
   (f) forming pockets consisting of shells made integrally with and at one end of said panels and injecting plastic into said mold to substantially cover the shells to form plastic liners in said shells in the areas of each of said sets of cut lines and apertures to create a plurality of individual packages; and
   (g) cutting said packages from said panels.

* * * * *